Figure 1:
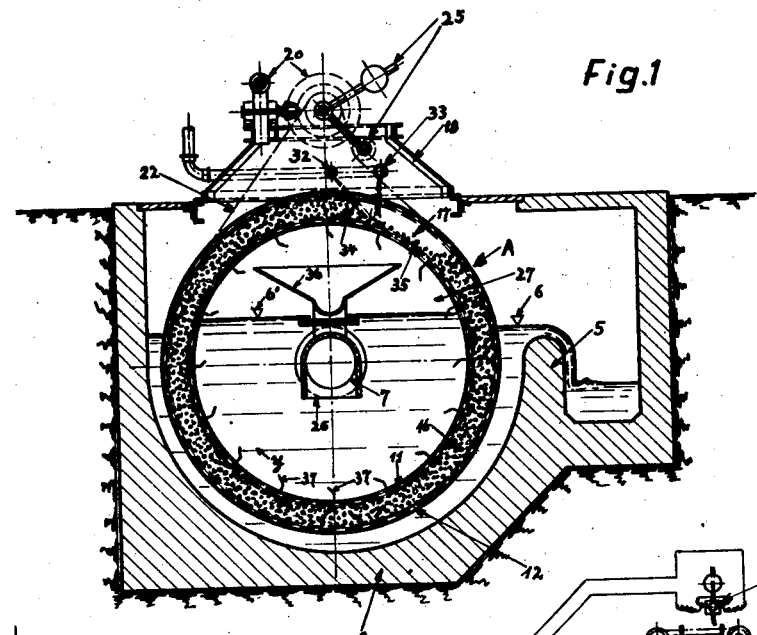

Sept. 10, 1935.　　　　R. MENSING　　　　2,014,144
FILTERING APPARATUS AND PROCESS OF OPERATING THE SAME
Filed Sept. 20, 1932

Inventor
Richard Mensing
By *D. Berg*
Attorney

Patented Sept. 10, 1935

2,014,144

UNITED STATES PATENT OFFICE 2,014,144

FILTERING APPARATUS AND PROCESS OF OPERATING THE SAME

Richard Mensing, Neustadt-Haardt, Germany

Application September 20, 1932, Serial No. 633,998
In Germany March 3, 1931

6 Claims. (Cl. 210—199)

My invention relates to a filtering apparatus and more especially to the class of water filters showing a revoluble drum or cylinder, which comprises spaced outer and inner perforated cylindrical walls or wire-mesh sieve cylinders for holding between themselves filtering material such as sand or any material, which may be used for filtering purposes. Furthermore, the invention refers to a novel mode of operating such filtering apparatus as characterized by the foregoing.

The primary object of my invention is the provision of an apparatus of this character, which permits of a continuous, efficient filtering action and at the same time an effective and complete purification of the filtering material to remove all foreign matters therefrom and to realize the regeneration thereof.

A further object of the invention is to perform the perfect cleaning of the filtering material in a convenient and easy manner without the use of comprehensive and expensive constructional means. Finally, the whole apparatus shall be simple in construction and strong, durable and inexpensive in manufacture and installation.

With this and other objects in view the invention consists in the features of construction, operation, combination and arrangement of parts as will be hereinafter fully described, illustrated in the drawing and pointed out in the claims hereunto appended.

Figure 2:
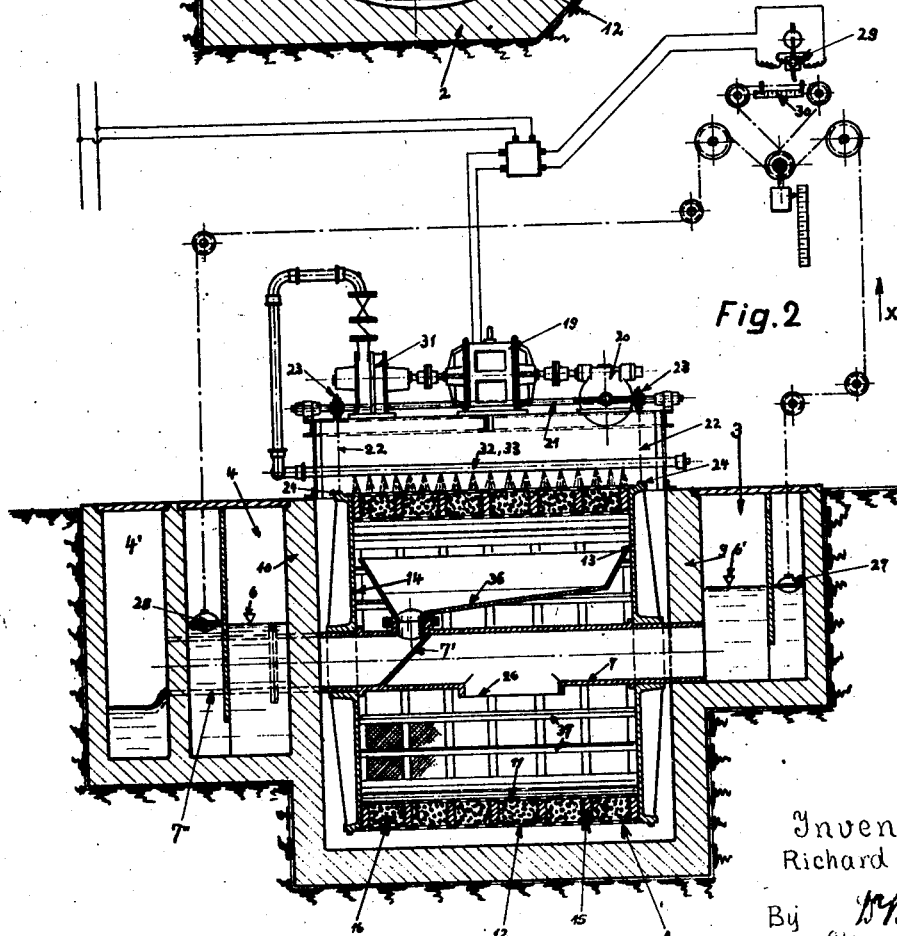

Fig. 1 is a cross-section of an apparatus in accordance with the invention and Fig. 2 is a sectional side elevation.

Similar reference characters designate corresponding parts throughout the description and drawing. 2 means a reservoir made of brickwork or any suitable material and having a substantially semi-circular shape in cross-section and open at the top. At one end of the reservoir 2 an inlet chamber 3 for the water to be treated and at the other end an outlet chamber 4 for the filtered water are provided for, whereas a longitudinal lateral dam wall 5 extends the required height in the reservoir to establish and maintain a predetermined water level 6 of the cleaned water. A hollow stationary shaft or pipe 7 is supported by the end walls 9 and 10 and opens through the latter and the filtering drum or cylinder A into the chambers 3 and 4 with their respective ends.

The drum is built up of two cylindrical, perforated spaced walls, namely an inner wall 11 and an outer wall 12 carried by and tightened to two spaced disks or covers 13, 14, which are rotatably mounted upon the said hollow shaft 7. Instead of perforated metal sheets 11, 12 wire-mesh sieves or a combination of both thereof may be used. The space between the said walls 11, 12 is divided by radially disposed partitions or rings 15 made of wood or other suitable material and forming ring-shaped pockets for holding the filtering sand 16. It is an important feature of the invention that the pockets are not perfectly filled out with filtering material; on the contrary in each pocket a hollow space 17 of sufficient arcuate length and extending along its whole breadth is formed or left near the vertex of the filtering drum A or in the proximity thereof.

At the top of the reservoir 2 a frame work 18 is arranged to carry the mechanical arrangement for the operation of the filtering plant. A motor 19 rotates by means of a transmitting gear 20 a shaft 21, from which the drum or cylinder A is driven by means of chains 22 and toothed wheels 23 and 24. A tensioning arrangement 25 is provided to hold the chains continuously tensioned and to ensure a correct drive.

The operation of the filtering apparatus is as follows:

The impure water flows from the inlet chamber 3 through the pipe 7 closed at 7' and provided with a bottom opening 26, into the inner free space 27 of the drum A, passes through the filtering material and enters as cleaned water the reservoir 2, the pure water raising up to the level 6 and streaming over the dam wall 5 into the outlet chamber 4. Assume the drum A is at rest, the level 6' in the interior of the drum A will gradually rise according to the increasing formation of the filtering film. This filtering film is constituted from the foreign matter by becoming deposited on the single solid particles of the filtering material and is highly valuable for an efficient filtering action.

However, with the progressive formation of the filtering film, that means an increasing soiling of the filtering material, the passage of the water through the filtering material is checked and the level 6' rises with respect to the level 6. To prevent a detrimental grade of the soiling and to uphold a correct working of the filtering apparatus a floating governor has been provided for, consisting of the floats 27 and 28 within the chambers 3 and 4 respectively, the switch 29 and the driving mechanism 30; as such constructions are well known a detailed description should be dispensed with. If the floating chain is moved in the direction of the arrow x the motor 19 begins to revolve, whereby the drum A is quite slowly rotated in the direction of the arrow y and the rotary pump sucks pure water from the reservoir 2 and feeds the spray pipes or nozzles 32 and 33 arranged axially above the rotary axis of the drum A and above the hollow space 17. The water streams of the nozzles 32 act upon the filtering material exposed by the slope 34 and turn it around to form within the hollow space 17 upon the inner sieve or perforated cylinder 11 a relatively very thin layer of sand 35, which can be easily sprayed or sprinkled by the pressing water of the nozzles 33. In this way the filtering material is thoroughly washed out and freed from foreign matter. It will be apparent that at the same time those circumferential parts of the filtering pockets dipping into the water show a correct filtering function, owing to the fact, that the material having passed through the washing zone and the hollow space 17, is collected and heaped by the action of gravity to fill out the entire space between the sieves 11 and 12. As the cleaned material shows its resistance of passage reduced the water level sinks, whereby the movement of the switch is reversed and the motor is thrown out of operation. The dirty water for turning round and washing out the filtering material is received by the trough 36, carried by the pipe 7, and discharged by the extended part 7'' of the pipe 7 into an outlet 4'. To remove floating and sinking substances from the interior of the drum A the sieve-wall 11 is provided with shovels 37 or the like which throw off these substances into the trough 36.

The mode of operation as hereinbefore described is based upon the water pressure or water level, that is constituted during the action of the apparatus. Another mode of operation consists in using a switching watch, as such are well known, and which throws the motor into and out of operation, after a distinct period of time has elapsed, thus carrying out the filtering operation without regard to the state of the filtering material itself.

I desire it to be understood that my invention is not limited to the particular constructions shown and described, and I aim in the appended claims to cover all modifications which do not depart from the feature of my invention.

What I claim is:

1. In combination, an axially horizontal filtering drum comprising spaced inner and outer coaxial perforated walls to form a pocket space therebetween; granular filtering material partly filling said space and leaving a free space at the upper part of the drum, and an approximately bare area on the upper face of the upper part of the inner wall; means for filling the lower part of the interior of the drum with liquid to be filtered and conducting the liquid from the exterior of said part, whereby foreign matter is collected on the material; automatic means for slowly rotating the drum whereby filtering material with foreign matter thereon is brought to the top of said space and a few grains at a time separate and tumble down said approximately bare area; and spraying means above said approximately bare area for directing jets of water against the partially bare part of the inner wall and the grains as they tumble down said area and expose different sides of the grains to the jets for facilitating washing foreign matter from the grains and the inner face of the inner wall.

2. Apparatus comprising a non-upright rotary filtering drum comprising spaced inner and outer perforated walls to form a space therebetween; filtering material partly filling said space and leaving a substantially free space at the upper part of the drum; means for supplying and passing liquid to be filtered through the lower part of the interior of the drum to the exterior thereof; spraying means above said free part for directing jets of water against loose grains as they tumble down said free space; and a conducting trough under said free space.

3. In combination, an axially horizontal filtering drum comprising spaced inner and outer coaxial perforated walls to form a pocket space therebetween; granular filtering material partly filling said space and leaving a free space at the upper part of the drum, and a substantially bare area on the upper face of the upper part of the inner wall thereby to form a hollow approximated cylindrical mass of the material having a substantially complete vacant segment free of the grain; means for conducting liquid through the said lower part of the material; means for slowly rotating the drum; a means for spraying jets, substantially tangential to said bare area, at the rear edge of the segment to separate and project a few grains at a time and turn and tumble them across said bare area and deposit them at the advance edge of said segment; and jet means above said approximately bare area for directing jets of water against the partially bare part of the inner wall and the separate grains as they are projected by the first named jets across said area, thereby to wash different sides of the grains for facilitating washing foreign matter from the grains and the inner face of said inner wall.

4. In combination, an axially horizontal filtering drum comprising spaced inner and outer coaxial perforated walls to form a pocket space therebetween; granular filtering material partly filling said space and leaving a free space at the upper part of the drum, and a substantially bare area on the upper face of the upper part of the inner wall thereby to form a hollow approximated cylindrical mass of the material having a substantially complete vacant segment free of the grain; means for filling the lower part of the interior of the drum with liquid to be filtered and conducting the liquid from the exterior of said part, whereby foreign matter is collected on the material; automatic means for slowly rotating the drum whereby filtering material with foreign matter thereon is brought to the top of said free segment; a means for spraying jets, substantially tangential to said bare area, at the rear edge of the segment to separate and project a few grains at a time and turn and tumble them across said bare area; and jet means above said approximately bare area for directing jets of water against the partially bare part of the inner wall and the separate grains as they are projected by the first named jets across said area and thereby to wash different sides of the grains for facilitating washing foreign matter from the grains and the inner face of said inner wall.

5. A filtering method comprising rotating about its axis a combined axially horizontal hollow substantially cylindrical mass of granular filtering material thick at its lower part and having a segment, at its upper part, substantially free of the grains; passing liquid to be filtered through said lower part; slowly rotating the cylinder while maintaining said upper segment substantially free of the grains; directing jets of cleaning liquid substantially tangential to the cylinder against the grains at the rear edge of said segment and thereby separating, projecting and tumbling grains from the rear edge of the segment across the free space of the segment to the advance edge of the segment; and directing another set of jets of cleaning liquid tangentially against the grains being projected across said free space.

6. A filtering method comprising rotating about its axis an axially horizontal hollow substantially cylindrical mass of granular filtering material thick at its lower part and having a complete vacant segment, at its upper part, substantially free of the grains; filling the lower part of the interior of the drum with liquid to be filtered and passing it from the interior to the exterior of said lower part; slowly rotating the cylinder while maintaining said upper segment substantially free of the grains; directing jets of cleaning liquid substantially tangential to the cylinder against the grains at the rear edge of said segment, thereby separating, projecting and tumbling grains from the rear edge of the segment across the free space of the segment to the advance edge of the segment; directing another set of jets of cleaning liquid tangentially against the grains being projected across said free space; and collecting and conducting away said cleaning liquid after it has passed through the free space.

RICHARD MENSING.